United States Patent
Chang et al.

(10) Patent No.: US 11,784,703 B2
(45) Date of Patent: Oct. 10, 2023

(54) SYSTEM AND METHOD FOR DIFFRACTION OF ELECTROMAGNETIC WAVE

(71) Applicant: NATIONAL CHUNG CHENG UNIVERSITY, Chiayi County (TW)

(72) Inventors: Sheng-Fuh Chang, Chiayi County (TW); Chia-Chan Chang, Chiayi (TW); Shih-Cheng Lin, Taitung (TW); Yuan-Chun Lin, Hsinchu County (TW)

(73) Assignee: National Chung Cheng University, Chiayi County (TW)

( * ) Notice: Subject to any disclaimer, the term of this patent is extended or adjusted under 35 U.S.C. 154(b) by 6 days.

(21) Appl. No.: 17/159,294

(22) Filed: Jan. 27, 2021

(65) Prior Publication Data

US 2022/0059947 A1 Feb. 24, 2022

(30) Foreign Application Priority Data

Aug. 18, 2020 (TW) .................. 109128106

(51) Int. Cl.
*H04B 7/145* (2006.01)
*H01Q 21/06* (2006.01)

(52) U.S. Cl.
CPC .......... *H04B 7/145* (2013.01); *H01Q 21/062* (2013.01); *H01Q 21/065* (2013.01)

(58) Field of Classification Search
CPC .... H01Q 9/285; H01Q 9/0407; H01Q 13/206; H01Q 21/005; H01Q 21/06; H01Q 21/061; H01Q 21/062; H01Q 21/065; H01Q 21/068; H04B 7/145; H04B 7/2606
See application file for complete search history.

(56) References Cited

U.S. PATENT DOCUMENTS

2015/0077295 A1 3/2015 Wong et al.

OTHER PUBLICATIONS

Spoof Surface Plasmon Polariton Leaky-Wave Antennas Using Periodically Loaded Patches Above PEC and AMC Ground Planes, Qingle Zhang, et al., arXiv:1705.01098v1, physics.app-ph, May 2, 2017.
A Millimeter-Wave Spoof Surface Plasmon Polaritons-Fed Microstrip Patch Antenna Array, Di Cao, et al., IEEE Transactions On Antennas and Propagation, vol. 68, No. 9, Sep. 2020.
Conformal Propagation and Near-Omnidirectional Radiation With Surface Plasmonic Clothing, Xi Tian, et al., IEEE Transactions On Antennas and Propagation, vol. 68, No. 11, Nov. 2020.
Fernandez-Dominquez, A.I., Martin-Moreno, L., Garcia-Vidal, F.J., Andrews, S.R. and Maier, S.A.. "Spoof Surface Plasmon Polariton Modes Propagating Along Periodically Corrugated Wires." IEEE Journal of Selected Topics in Quantum Electronics, 14 (6), 2008. 1515-1521.

(Continued)

*Primary Examiner* — Robert Karacsony
(74) *Attorney, Agent, or Firm* — Rosenberg, Klein & Lee

(57) ABSTRACT

A system for diffraction of an electromagnetic wave includes a substrate, a transmission unit, and a plurality of antennas. The substrate is made of a second medium. The transmission unit is disposed on the substrate. The transmission unit has a plurality of transmission lines. Each of the transmission lines has a transmission line length that is associated with a first medium operation wavelength that is associated with an operation frequency. The transmission lines are connected successively. The antennas are disposed on the substrate, respectively.

18 Claims, 19 Drawing Sheets

(56) References Cited

OTHER PUBLICATIONS

Song, Kyungjan and Mazumder, Pinaki. "Active Terahertz Spoof Surface Plasmon Polariton Switch Comprising the Perfect Conductor Metamaterial." IEEE Transactions on Electron Devices, 56 (11), 2009. 2792-2799.

Guan, D.F., You, P., Zhang, Q., Yang, Z.B., Liu, H. and Yong, S.W.. "Slow-Wave Half-Mode Substrate Integrated Waveguide Using Spoof Surface Plasmon Polariton Structure." IEEE Transactions of Microwave Theory and Techniques, 66 (6), 2018. 2946-2952.

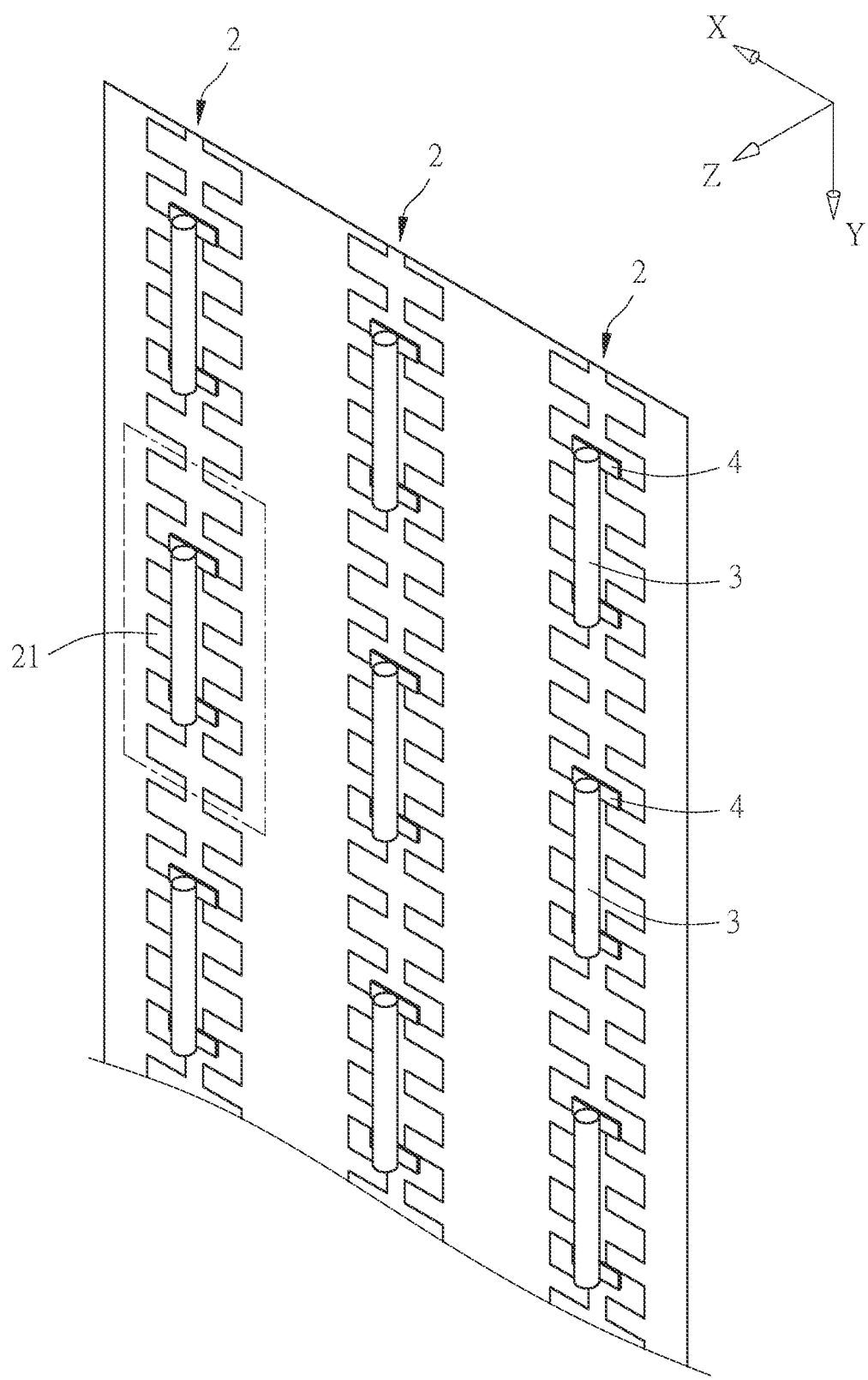
F I G . 1A

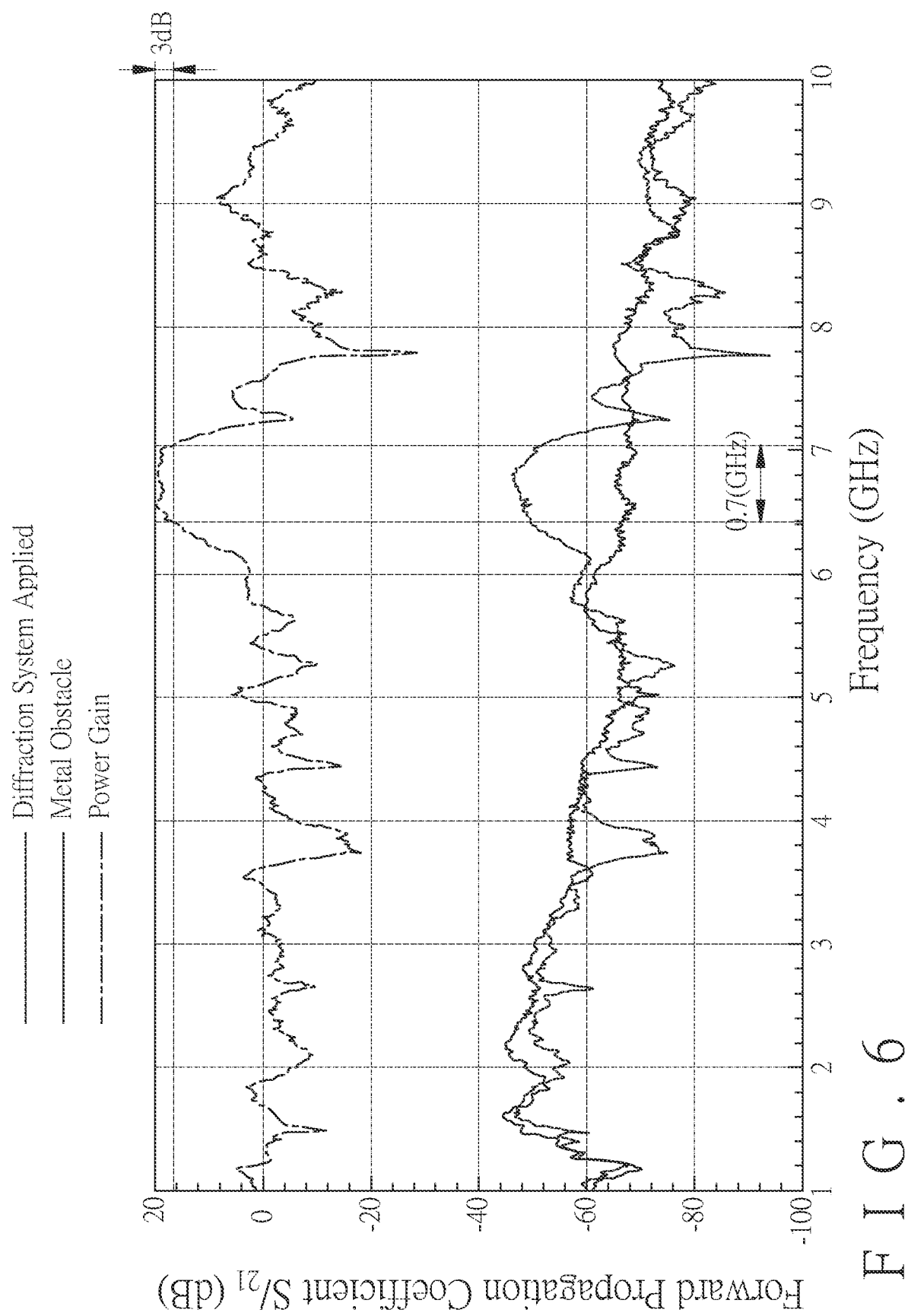
F I G . 6

SYSTEM AND METHOD FOR DIFFRACTION OF ELECTROMAGNETIC WAVE

BACKGROUND

1. Technical Field

The present disclosure relates to a system and a method for diffraction of an electromagnetic wave. Accordingly, the present disclosure severally relates to a system and a method for diffraction of an electromagnetic wave that use a transmission unit and a plurality of antennas to make an incident electromagnetic wave bypass an obstacle.

2. Description of Related Art

In a mobile communication system, due to the short wavelengths and high loss of electromagnetic waves, as well as shielding effects caused by buildings, trees, furniture and signboards, there are often communication dead areas, dark zones or places where have inferior coverage. One existing solution to this is adding more base stations or boosters. Thus, it is common that tens of thousands of base stations or boosters are intensively deployed in an urban environment. However, such a solution is costly and labor-consuming when implemented and its high power consumption and complicated maintenance are also concerns. From the perspective of users, the highly dense network of base stations can be a source of psychological stress.

SUMMARY

The system for diffraction of an electromagnetic wave in one embodiment of this disclosure has a substrate, a transmission unit, and a plurality of antennas.

The substrate is set in a space rife of a first medium, the substrate is made of a second medium, the transmission unit is disposed on the substrate, the transmission unit includes a plurality of transmission lines. Each of the transmission lines has a transmission line length. The transmission line length is associated with a first medium operation wavelength. The first medium operation wavelength is associated with an operation frequency. The transmission lines are connected successively. The antennas are disposed on the substrate, respectively, so that the antennas are close to some of the transmission lines and located on sites having approximate phases in the corresponding transmission lines. Each of the antennas is configured to feed the electromagnetic wave it receives at the operation frequency to the corresponding transmission lines for transmission and radiate the electromagnetic wave transmitted in the corresponding transmission lines outward at the operation frequency.

The method for diffraction of an electromagnetic wave in one embodiment of this disclosure includes the following steps:

covering an obstacle with the system, wherein the obstacle obstructs propagation of the electromagnetic wave and includes a first side and a second side; and having the electromagnetic wave enter the system at the first side in an incidence direction, wherein the incidence direction and a normal vector of the first side include an angle, having the antennas at the first side receive the electromagnetic wave and feed the received electromagnetic wave to the corresponding transmission line for transmission, having the transmission line transmit the electromagnetic wave to a site at the second side, and having the antennas at the second side radiate the electromagnetic wave outward in a direction that includes the angle with a normal vector of the second side.

The system in one embodiment of this disclosure has a substrate, a transmission unit, and a plurality of antennas.

The substrate is set in a space rife of a first medium, and includes an incidence area and a transmission area. The substrate is made of a second medium. The transmission unit is disposed on the substrate, the transmission unit includes a plurality of transmission lines. Each of the transmission lines has a transmission line length. The transmission line length is associated with a first medium operation wavelength. The first medium operation wavelength is associated with an operation frequency. The transmission lines are connected successively. The antennas are disposed on the substrate, respectively, so that the antennas are close to some of the transmission lines and located on sites having approximate phases in the corresponding transmission lines. Each of the antennas is configured to feed the electromagnetic wave it receives at the operation frequency to the corresponding transmission lines for transmission and radiate the electromagnetic wave transmitted in the corresponding transmission lines outward at the operation frequency.

The method for diffraction of an electromagnetic wave in one embodiment of this disclosure includes the following steps.

covering an obstacle with the system, having the electromagnetic wave enter the system at the first side in an incidence direction, wherein the incidence direction and a normal vector of the incidence area include an angle, having the antennas in the incidence area receive the electromagnetic wave and feed the received electromagnetic wave to the corresponding transmission line for transmission, having the transmission line transmit the electromagnetic wave to the antennas in the transmission area, and having the antennas in the transmission area radiate the electromagnetic wave outward in a direction that includes the angle with a normal vector of the transmission area.

BRIEF DESCRIPTION OF THE DRAWINGS

FIG. 1A is a partial, enlarged perspective view of the first embodiment.

FIG. 6 shows a graphical comparison between obstacles with and without the first embodiment covered thereon.

DETAILED DESCRIPTION

The disclosure will be best understood by reference to the following detailed description of illustrative embodiments when read in conjunction with the accompanying drawings.

Unless otherwise noted, similar elements will be identified by identical numbers throughout all figures.

Figure 1:
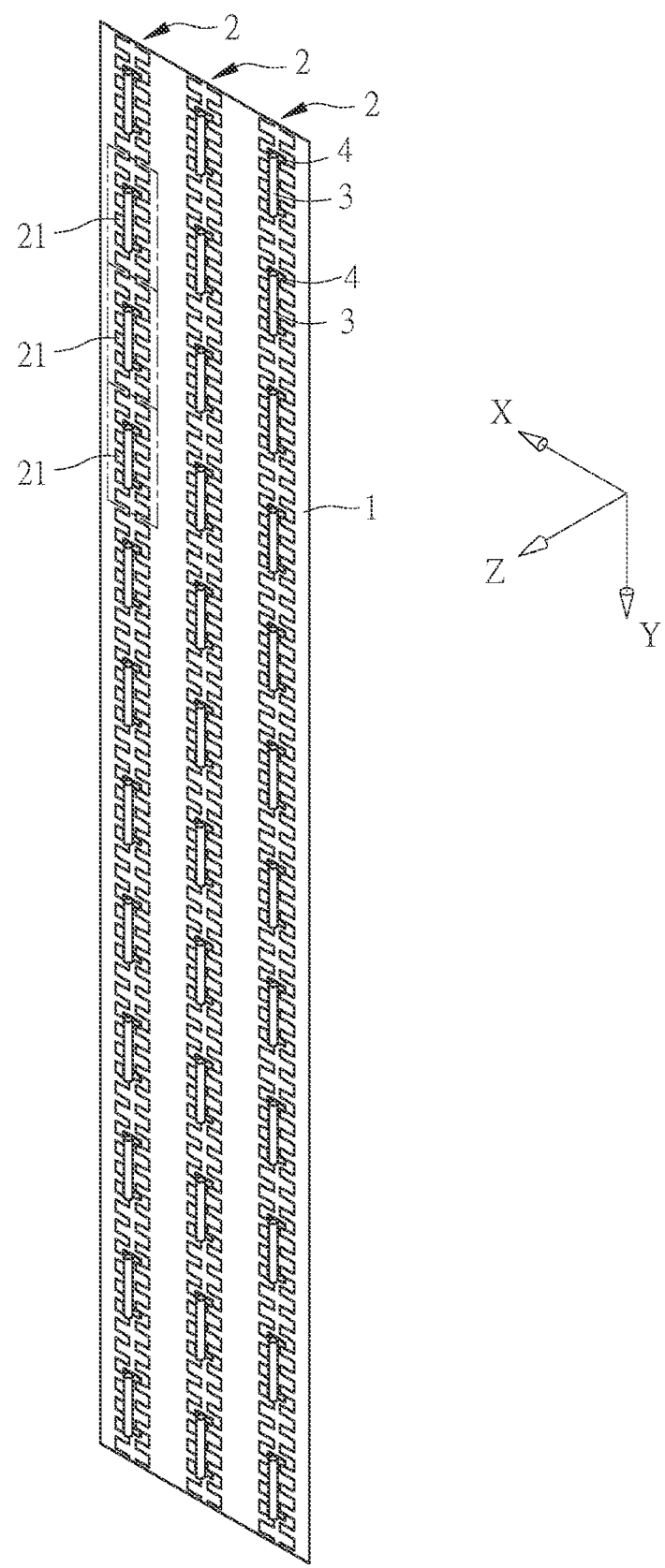
FIG. 1 is a perspective view of a system according to a first embodiment of the present disclosure.
Figure 2:
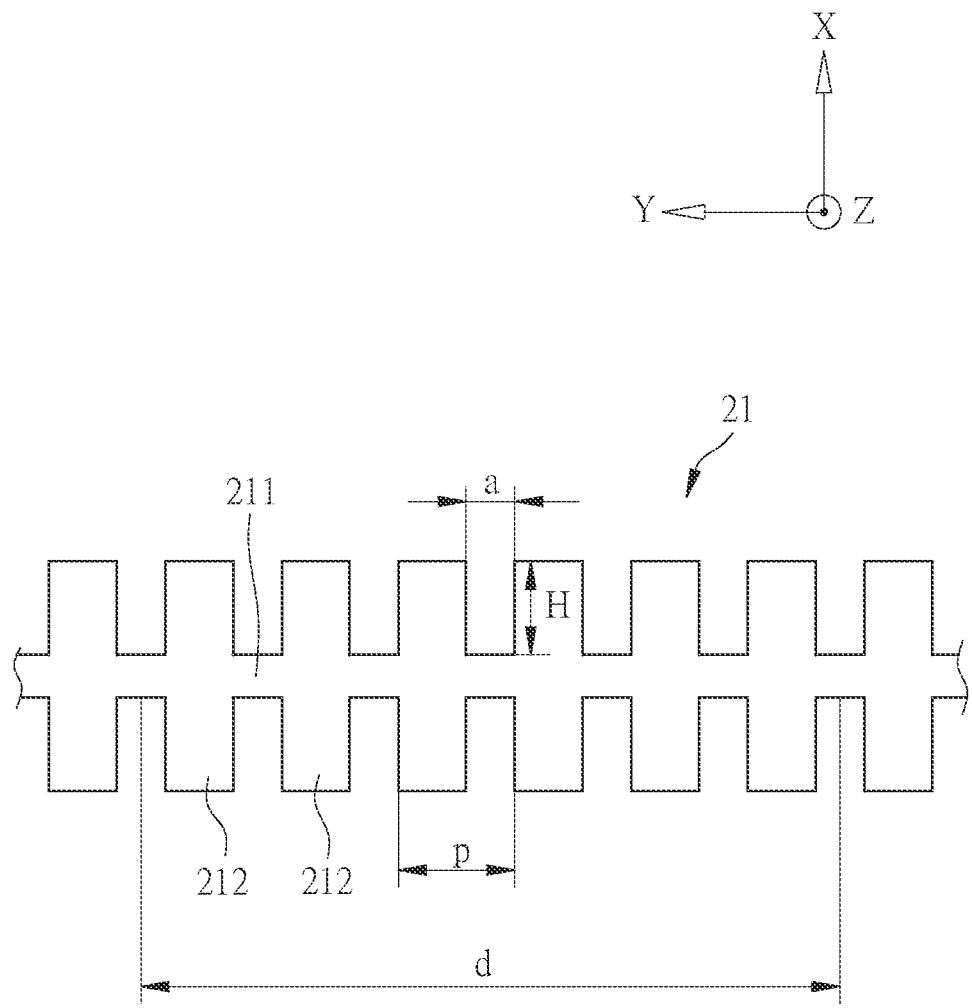
FIG. 2 is a schematic drawing, illustrating a transmission line of the first embodiment.
Figure 3:
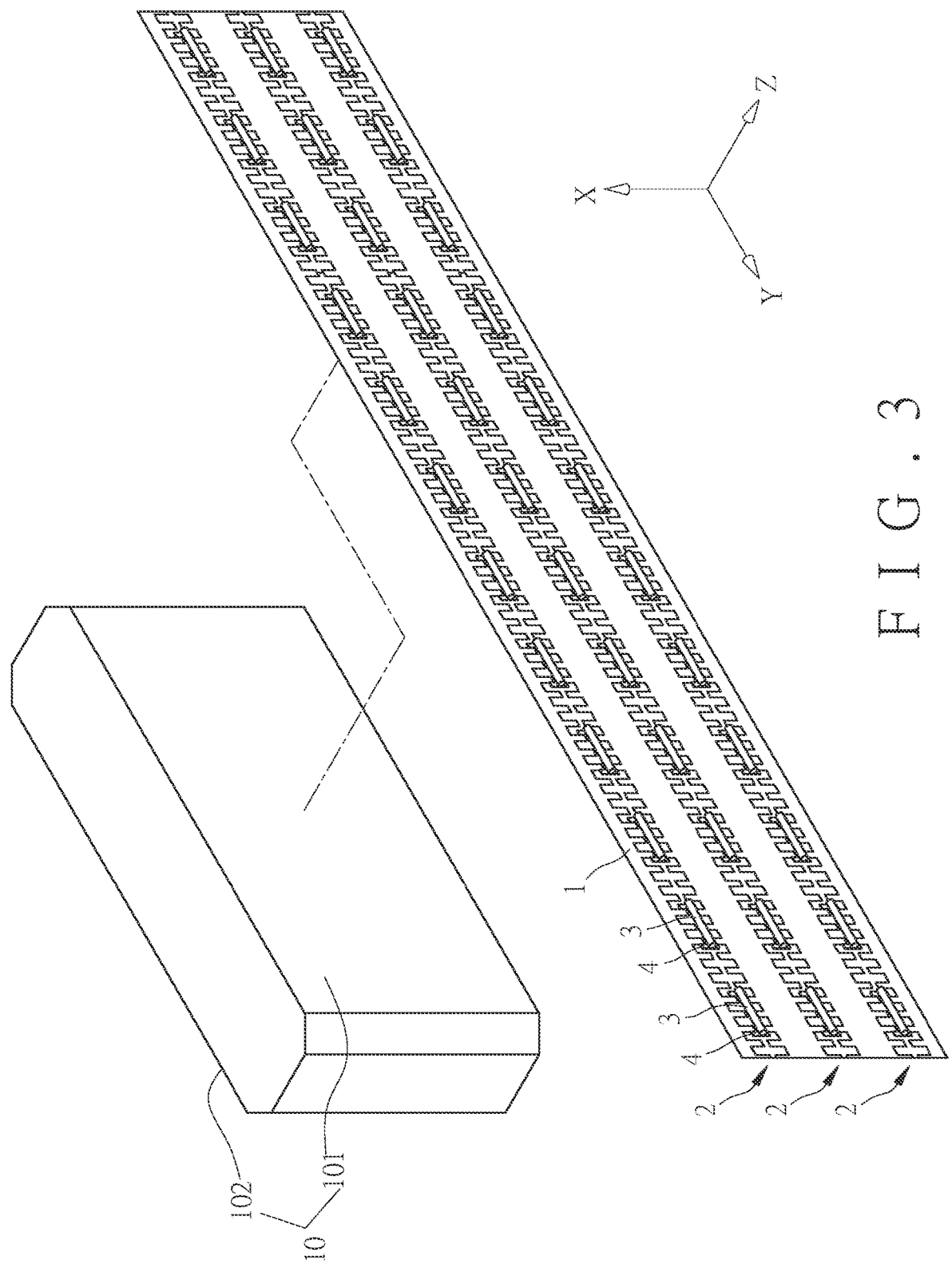
FIG. 3 is a schematic drawing, illustrating how the first embodiment covers an obstacle.

Referring to FIG. 1 through FIG. 3, a system for diffraction of an electromagnetic wave according to a first embodiment of the present disclosure is used to cover an obstacle 10 that may block the propagation of an electromagnetic wave. The obstacle 10 may be a sheet of metal. The obstacle 10 comprises a first side 101 and a second side 102 that are reverse to each other. The electromagnetic wave comes from a source that is at the same side of the obstacle 10 as the first side 101. When the electromagnetic wave comes to the first side 101 of the obstacle 10 not covered by the disclosed system, the electromagnetic wave is blocked by the obstacle 10 and unable to pass through the obstacle 10 and reach beyond the second side 102. The electromagnetic wave operates at an operation frequency. In the present embodiment, the operation frequency is 6.8 GHz, for example, but is not limited thereto. The disclosed system comprises a substrate 1, a plurality of transmission units 2, a plurality of antennas 3, and a plurality of insulating members 4. The disclosed system is set in a space rife of a first medium. In the present embodiment, the first medium is air or vacuum. It is to be noted that, the first medium is not limited to air or vacuum. Alternatively, it may be water, glass, or any composite material.

Referring to FIG. 1, FIG. 1A and FIG. 2, the substrate 1 are roughly rectangular. the substrate is made of a second medium. In the present embodiment, the substrate 1 is a high-frequency microwave laminate made of glass-reinforced hydrocarbon and ceramic, with a thickness of 0.508 mm.

The transmission units 2 are spaced on the substrate 1 in an arrangement direction X. Each of the transmission units 2 comprises a plurality of transmission lines 21 that are connected successively. Each of the transmission lines 21 has a transmission line length d. The transmission line length d is an operation wavelength. The operation wavelength is associated with a first medium operation wavelength. The first medium operation wavelength is associated with the operation frequency. In the present embodiment, the transmission line length d is parallel to an extension direction Y. The extension direction Y is perpendicular to the arrangement direction X. The transmission lines 21 are connected successively in a linear direction that is parallel to the extension direction Y, so that each of the transmission units 2 is parallel to the extension direction Y. Each of the transmission lines 21 is a spoof surface plasmon polaritons transmission line (SSPP TL). Since the wave vector of the electromagnetic wave transmitted over the SSPP TLs is greater than the wave vector of an electromagnetic wave propagated in a free space, electromagnetic energy transmitted over SSPP TLs is unlikely to radiate outward. Therefore, the SSPP TLs have very low radiation loss. Each of the transmission lines 21 comprises a first transmission portion 211 and a plurality of second transmission portions 212. In the present embodiment, there are six second transmission portions 212, for example. The first transmission portion 211 has a quadrilateral geometry, and more particularly rectangular. The first transmission portion 211 has a length that is the transmission line length d and is parallel to the extension direction Y. The second transmission portions 212 are parallel to the extension direction Y and spaced in the first transmission portion 211. Each of the second transmission portions 212 is also quadrilateral, and more particularly rectangular. Each of the second transmission portions 212 has a length perpendicular to the extension direction Y and is symmetrical about the first transmission portion 211. Therein, the first transmission portion 211 has a length that is the transmission line length d, and the first transmission portion 211 has a width that is smaller than a first gap a. Every two adjacent said second transmission portions 212 are separated by a distance that is the first gap a. A distance between corresponding sites on one second transmission portion 212 and its adjacent second transmission portion 212 is a second gap p. A minimum distance between either end of a second transmission portion 212 and the first transmission portion 211 in the direction perpendicular to the extension direction Y is a third gap H. The first gap a, the second gap p, and the third gap H have a relationship represented by the equation below.

$$\left(\frac{a}{p}\right)^2 = \left[\left(\frac{ck_{sspp}}{\omega\sqrt{\varepsilon_r}}\right)^2 - 1\right]\cot^2\left(2H\sqrt{\varepsilon_r}\frac{\omega}{c}\right) \quad (1)$$

where $k_{sspp}$ is an operation frequency wavenumber, $\lambda_{sspp}$ is the operation wavelength, which is associated with the first medium operation wavelength, $\varepsilon_r$ is a dielectric constant, $\omega$ is an angular frequency of the operation frequency, c is the velocity of light, a is the first gap, p is the second gap, and H is the third gap. It is to be noted that the dielectric constant $\varepsilon_r$ is the dielectric constant $\varepsilon_r$ of a medium filled between the first transmission portion 211 and the second transmission portions 212. In the present embodiment, the medium is the first medium.

Figure 4:
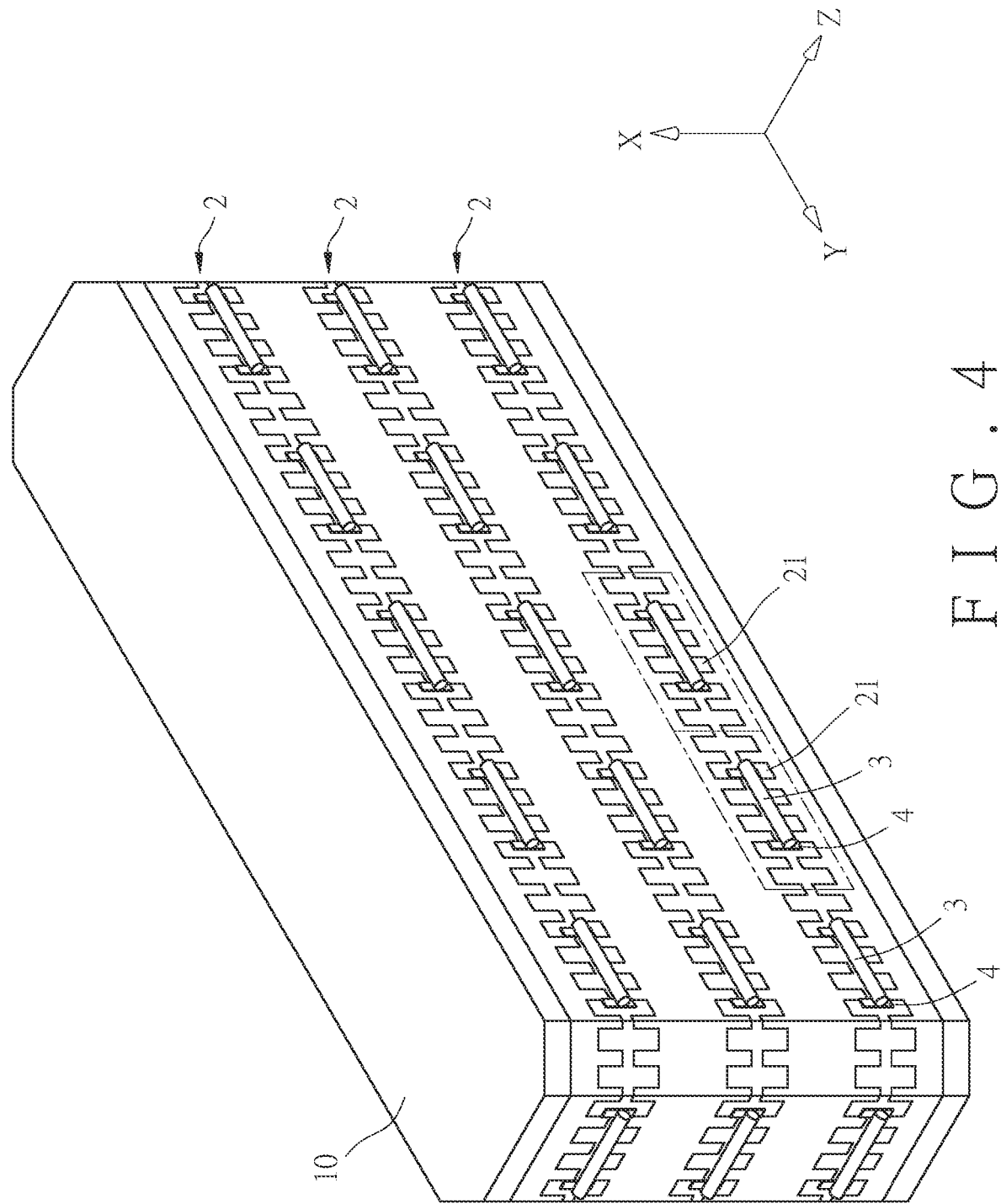
FIG. 4 is a perspective view, in which the first embodiment has covered and encircled the obstacle.

Referring to FIG. 2 through FIG. 4, the antennas 3 are disposed on the substrate 1, respectively. The antennas 3 are close to the transmission lines 21 and are located on sites having approximate phases in corresponding said transmission lines 21. Therein, the phrase "approximate phases" refers to two phases having a phase difference that is equal to or smaller than 30 degrees. Each of the antennas 3 is configured to feed the electromagnetic wave it receives at the operation frequency to the corresponding transmission lines 21 for transmission and radiate the electromagnetic wave transmitted in the corresponding transmission lines 21 outward at the operation frequency. In the present embodiment, each of the antennas 3 is a dipole antenna. The dipole antennas of the present embodiment have a length set to be a half of the first medium operation wavelength. Each of the dipole antennas is disposed on the corresponding transmission line 21, with its one end aligned with the second second transmission portion 212 counted from the end of the corresponding transmission line 21. The gap between centers of the dipole antennas ranges between one fourth and three fourths of the first medium operation wavelength. In the present embodiment, t gap between centers of the dipole antennas is a half of the first medium operation wavelength. It is to be further noted that, with the relationship of the first gap a, the second gap p, and the third gap H of each said transmission line 21 determined using Equation (1), values of the first gap a, the second gap p and the third gap H is tunable to achieve match between the transmission lines 21 and the corresponding antennas 3 at a wave impedance of the first medium.

The insulating members 4 are disposed between the transmission lines 21 and the antennas 3, respectively. Each of the insulating members 4 is made of an electrically non-conductive material. In the present embodiment, each of the insulating members 4 is made of a foam material. The insulating members 4 allow the antennas 3 to be close to but not in contact with the transmission lines 21.

Figure 5:
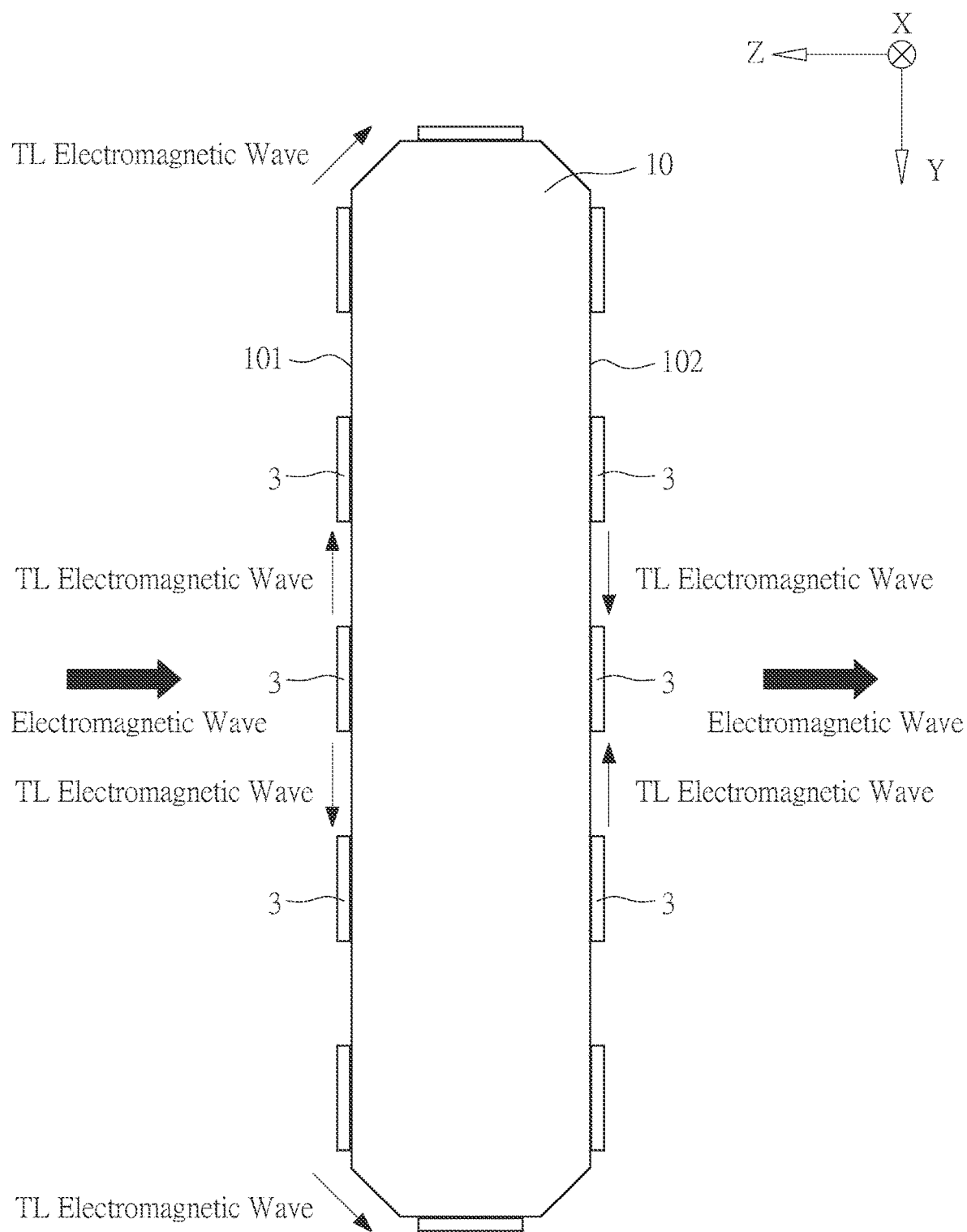
FIG. 5 is a side view, showing the first embodiment diffracting an electromagnetic wave.

Referring to FIG. 4 and FIG. 5, the disclosed system executes a method for diffraction of an electromagnetic wave. The method is carried out by encircling the obstacle 10 with the disclosed system, so that when coining to the disclosed system on the first side 101 in an incidence direction, an electromagnetic wave reaches the antennas 3 on the first side 101. Therein, the incidence direction is parallel to a normal direction Z. The normal direction is perpendicular to the arrangement direction X and the extension direction Y. The antennas 3 then feed the electromagnetic wave to the corresponding transmission lines 21. The electromagnetic wave is split into two TL electromagnetic waves that travel in opposite directions along the transmission lines 21. With connections among the transmission lines 21, the TL electromagnetic waves are transmitted over the transmission lines 21 from a point on the first side 101 to and meet at a point on the second side 102. The antennas 3 on the second side 102 are coupled with the TL electromagnetic waves and thus generate TL electromagnetic waves of the same phase. These later TL electromagnetic waves then radiate outward. Thereby, the disclosed system allows the original electromagnetic wave arriving at the first side 101 to bypass the obstacle 10 and reach the second side 102 for re-transmission, in turn solving the problems about communication dead zones otherwise caused by the obstacle 10.

The first embodiment is verified by the electromagnetic (EM) simulation software. The spatial power value of the electromagnetic wave before encountering the obstacle 10 is measured as 1.364 µW. After adding the obstacle 10 into the model, the spatial power value of the electromagnetic wave measured at the second side 102 of the obstacle 10 is 0.039 µW, less than 2.86% of the original spatial power value. Then the disclosed system was applied to the obstacle 10 in an manner that it encircled the obstacle 10. At this time, the spatial power value of the electromagnetic wave measured beyond the second side 102 of the obstacle 10 was 1µW, only 1.1 dB lower than the original spatial power value. This means that 77.8% of the original spatial power passed the obstacle 10.

Referring to FIG. 5 and FIG. 6, in the test conducted for the first embodiment, the obstacle 10 used was an aluminum foil plate. The throughput of the electromagnetic wave was measured without covering the obstacle 10 with the disclosed system first, and measured again after the obstacle 10 was encircled by the disclosed system. As demonstrated by the measurements, with the obstacle 10 covered by the disclosed system, the electromagnetic wave at 6.8 GHz bypassed the obstacle 10 successfully, and the power gain obtained beyond the second side 102 of the obstacle 10 was 100 times (about 20 dB) more. This only provided effective bandwidth gain of 0.7 GHz.

Referring to FIG. 1 and FIG. 2, it is to be further noted that the second transmission portions 212 of each transmission line 21 are disposed in the first transmission portion 211. An non-limiting arrangement is that the second transmission portions 212 are symmetrical about the first transmission portion 211 and perpendicular to the first transmission portion 211. Alternatively, they may be spaced along the length direction of the first transmission portion 211. In addition, the present disclosure puts no limitations on how many second transmission portions 212 each transmission line 21 has.

Figure 7:
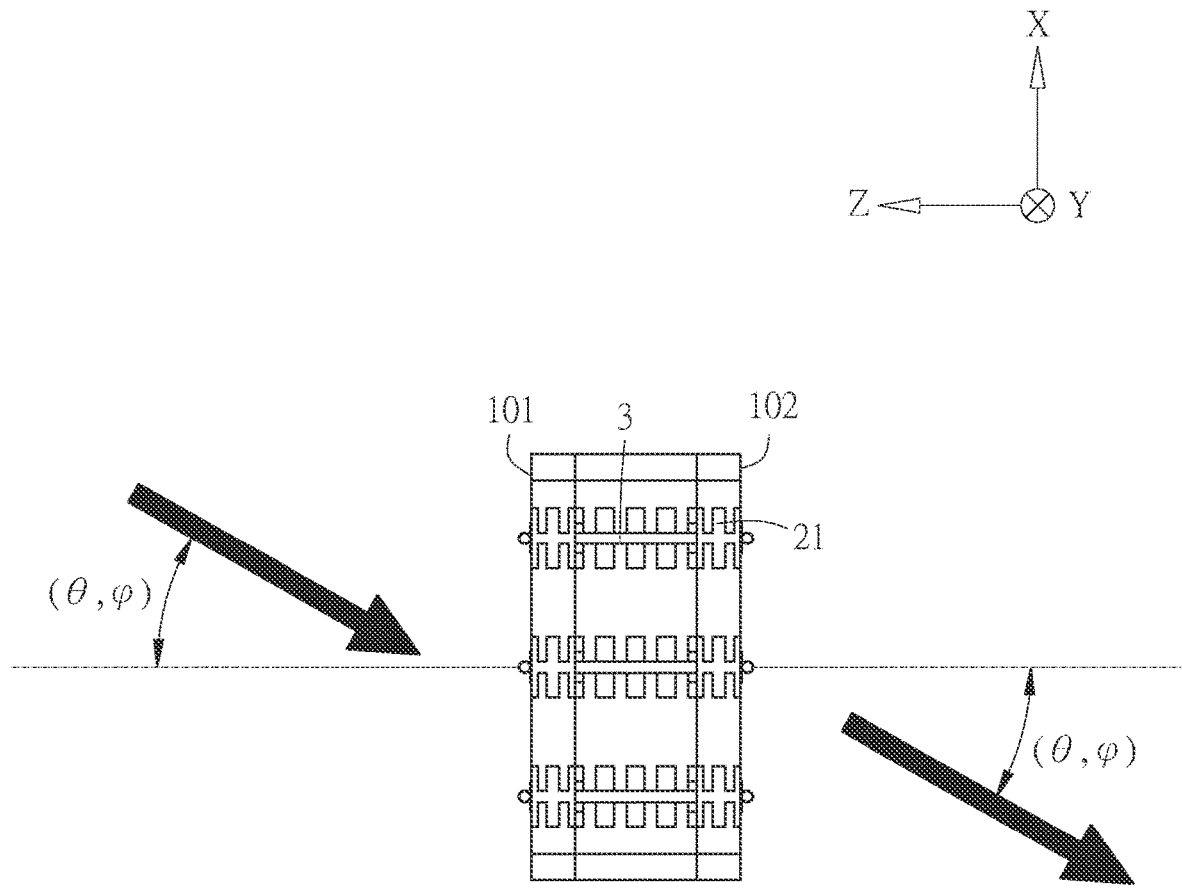
FIG. 7 is a top view, showing that an incident angle of the electromagnetic wave entering the first embodiment is equal to a transmission angle.

Referring to FIG. 7 shows a scenario where the electromagnetic wave arrives at the system on to the first side 101 obliquely. Therein, the normal vector of the first side 101 is parallel to the normal direction Z, and the normal vector of the second side 102 is also parallel to the normal direction Z. The incidence direction includes the angle with the normal vector of the first side 101, or the normal direction Z. The arrangement direction X, the extension direction Y and the normal direction Z represent a rectangular coordinate system. The angle is represented by a spherical coordinate angle $(\theta, \varphi)$. The spherical coordinate angle $(\theta, \varphi)$ is between +90 degrees and −90 degrees. The transmission lines 21 transmit the electromagnetic wave to a sire on the second side 102. The antennas 3 on the second side 102 cast the TL electromagnetic waves in a direction that include the same angle with the normal vector of the second side 102. Since the first side 101 and the second side 102 are parallel to each other, the TL electromagnetic waves radiate outward in the same incidence direction. Thereby, the present embodiment not only keeps the transmission angle of the electromagnetic wave equal to its incident angle, but also maintenance match between the electromagnetic wave and an incident plane as well as a radiation plane.

Figure 8:
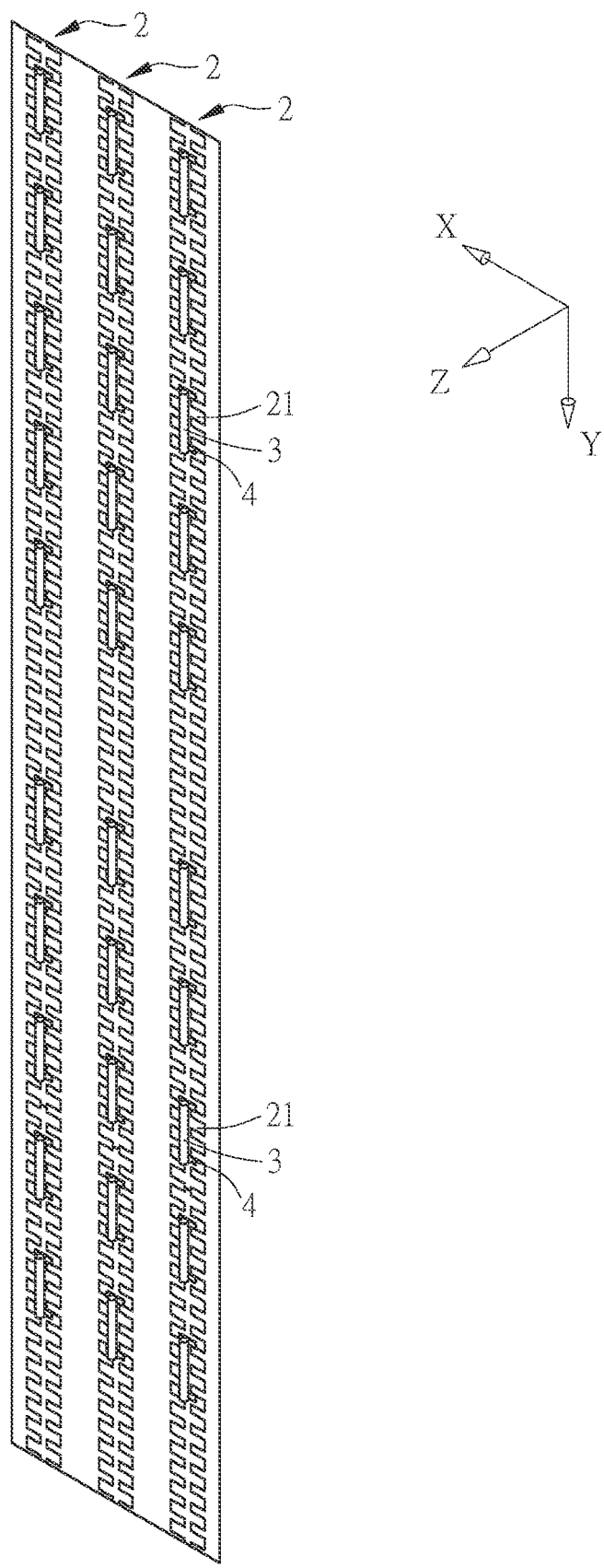
FIG. 8 is a perspective view of a system according to a second embodiment of the present disclosure.
Figure 9:
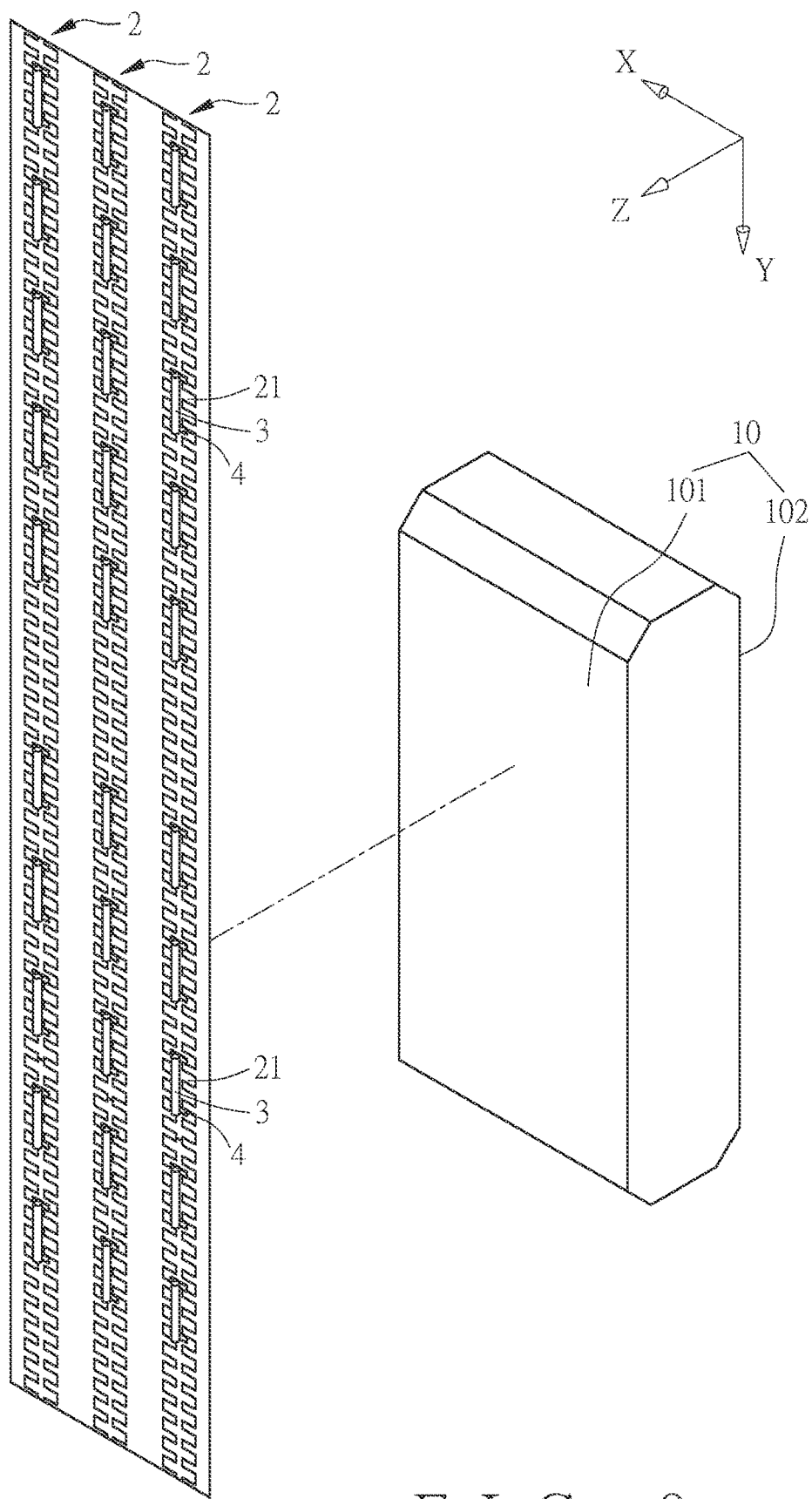
FIG. 9 is a schematic drawing, in which the second embodiment has covered the obstacle.
Figure 10:
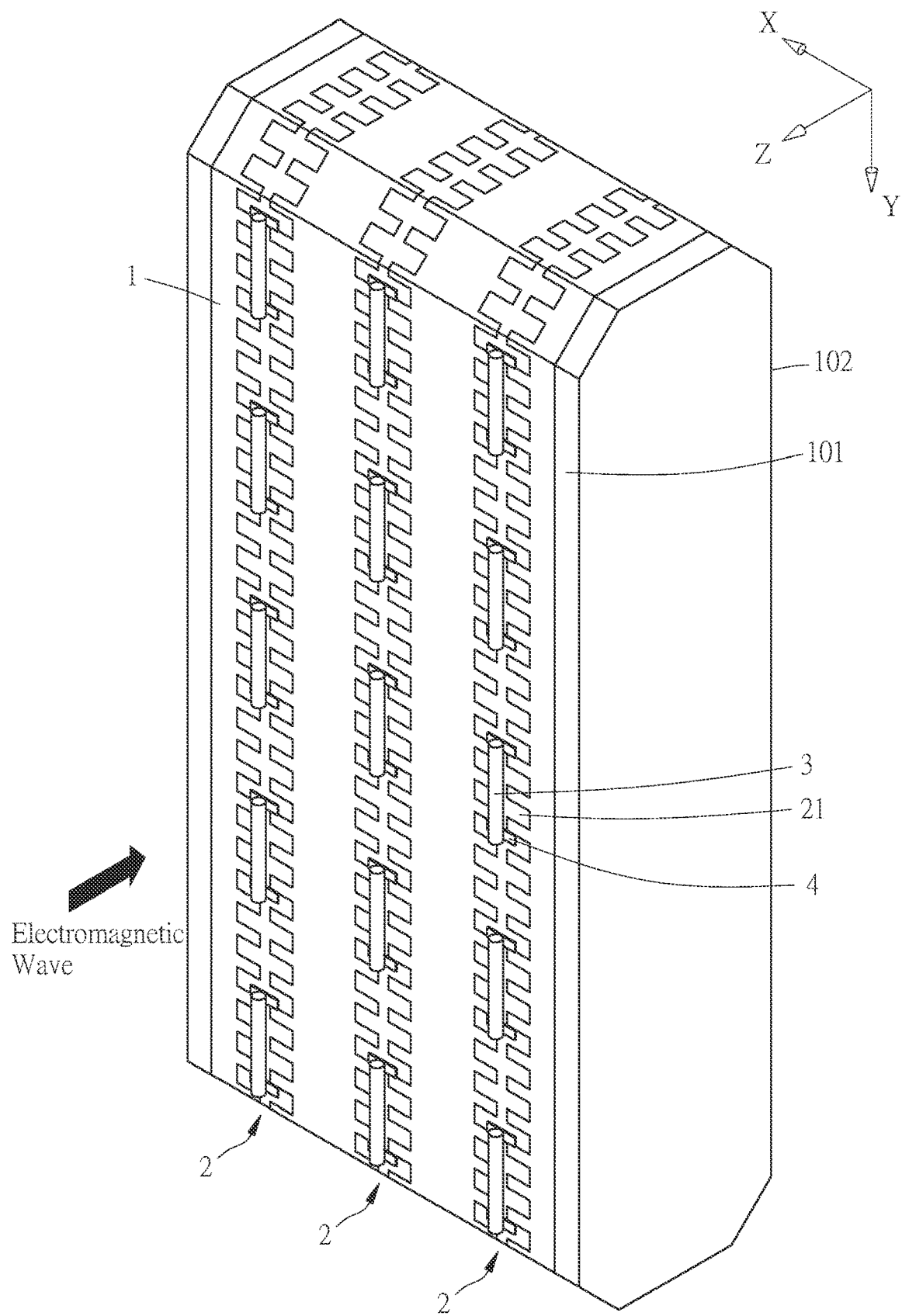
FIG. 10 is a perspective view, in which the second embodiment has covered the obstacle.

Referring to FIG. 8 through FIG. 10, a second embodiment of the disclosed system is similar to the first embodiment except that the antennas 3 are disposed on the substrate 1, respectively, and only close to some of the transmission lines 21. The antennas 3 are located on sites having approximate phases in the corresponding transmission lines via the insulating members 4. Similar to the first embodiment, the antennas 3 on the first side 101 receive the electromagnetic wave and fed the received electromagnetic wave to the corresponding transmission lines 21 for transmission. The transmission lines 21 transmit the TL electromagnetic waves to a site on the second side 102. The antennas 3 on the second side 102 radiate the TL electromagnetic waves outward in the incidence direction.

Figure 11:
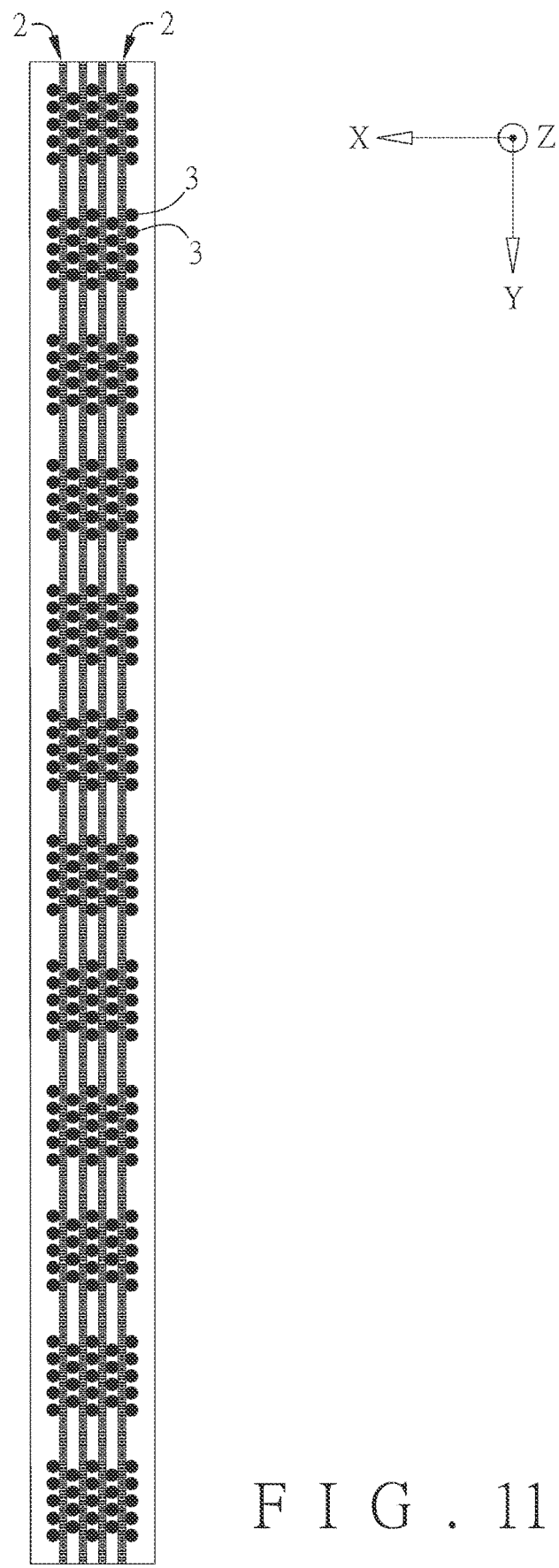
FIG. 11 is a front view of a system according to a third embodiment of the present disclosure.
Figure 12:
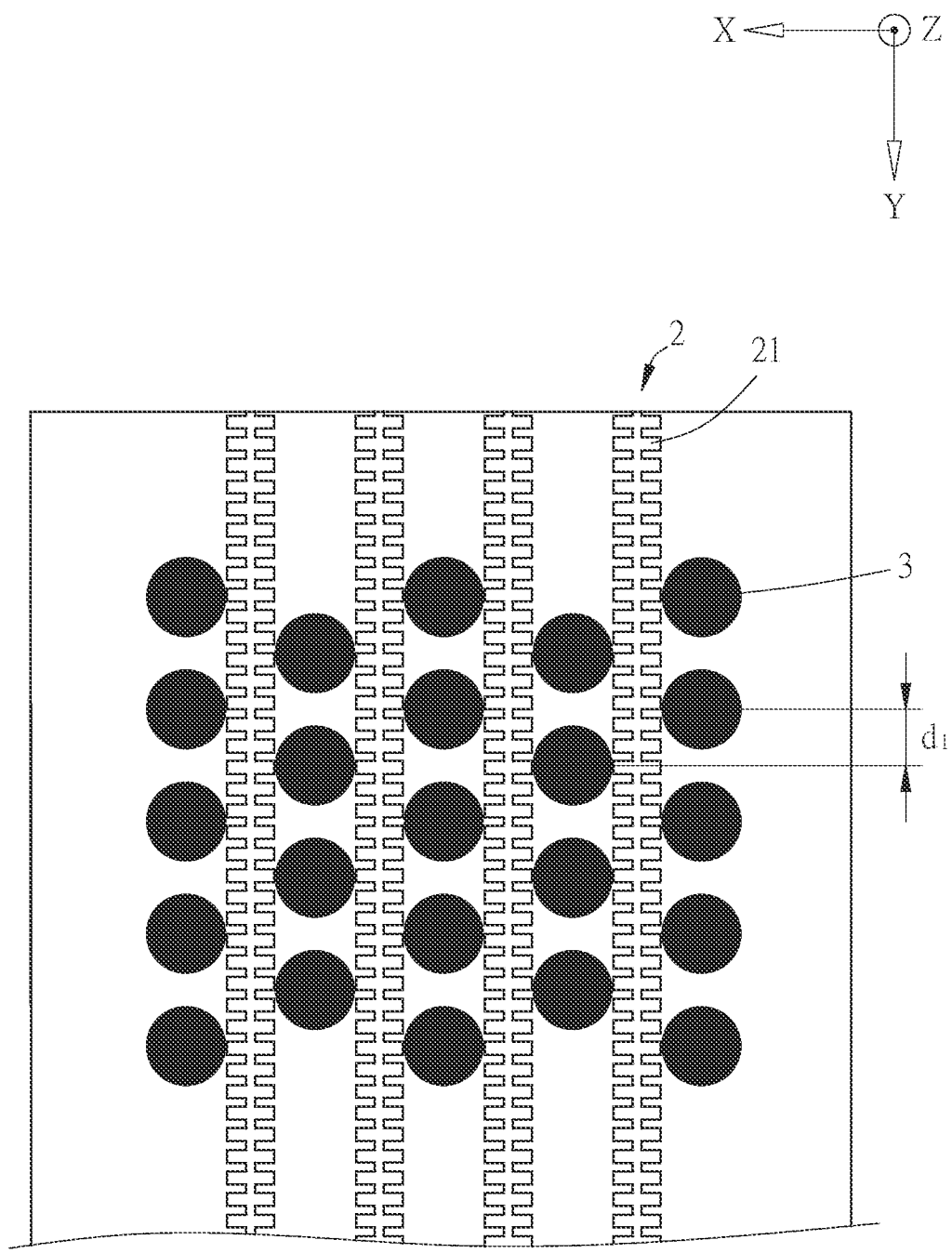
FIG. 12 is a partial, enlarged front view of the third embodiment.
Figure 13:
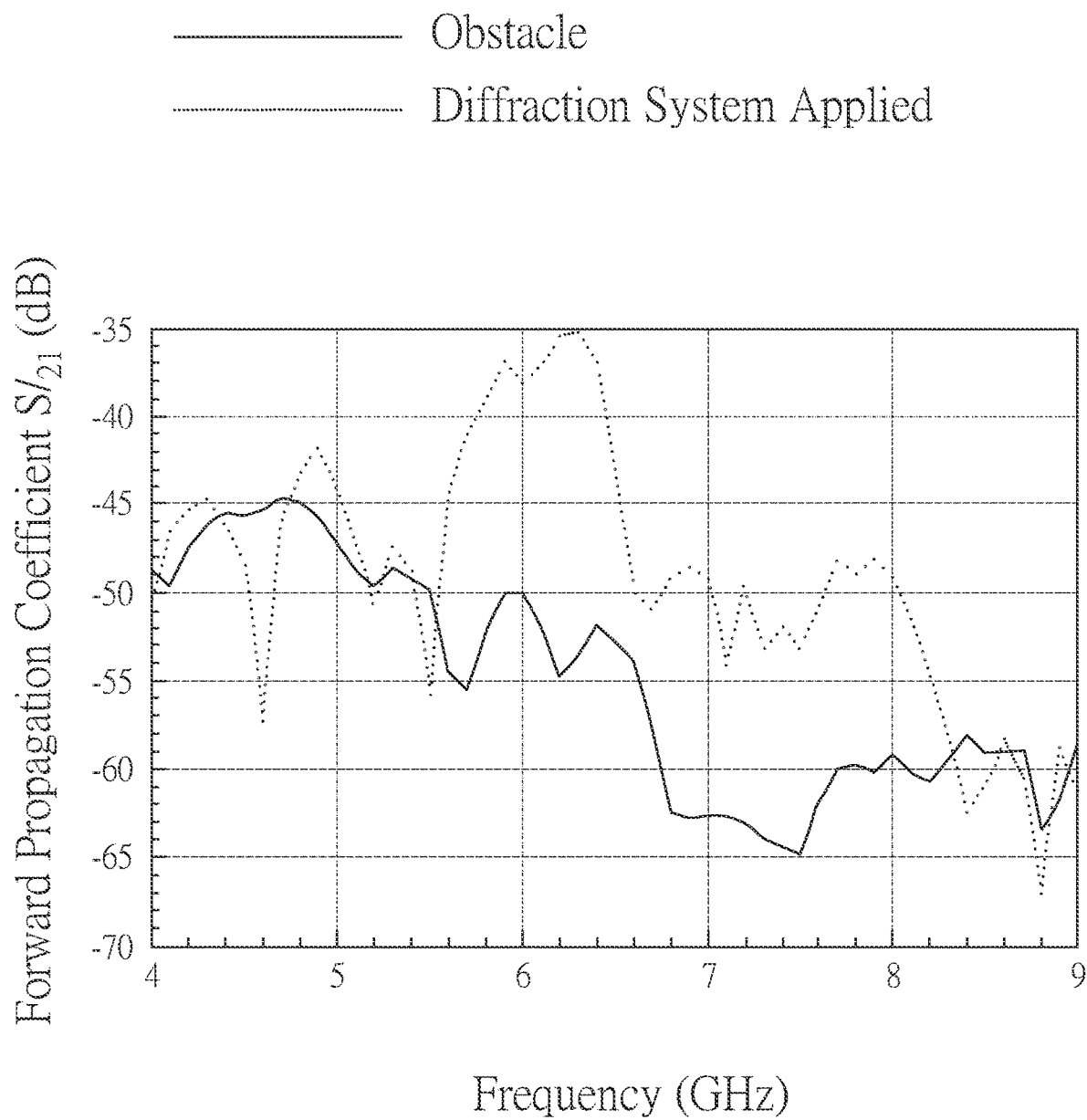
FIG. 13 shows a graphical comparison between obstacles with and without the third embodiment covered thereon.

FIG. 11 through FIG. 13 depict a third embodiment of the disclosed system. It is similar to the second embodiment except that each said antenna 3 is a patch antenna herein. The patch antenna comprises a metallic button, whose diameter is in inverse proportion with the operation frequency. The patch antennas and the transmission unit 2 are coplanar. The patch antennas are disposed at two sides of the transmission unit 2 about direction of the transmission line length d in a close and staggered arrangement. Therein, a gap $d_1$ between centers of each two adjacent said staggered patch antennas in a direction parallel to the transmission line length d ranges between one fourth and three fourths of the first medium operation wavelength. In the present embodiment, the gap $d_1$ between centers of each two adjacent said staggered patch antennas is a half of the first medium operation wavelength. The patch antennas and the transmission units 2 are coplanar, so the production is simplified. In the present embodiment, the operation frequency is, for example, 6.2 GHz. Tests were conducted for the third embodiment. The throughput of the electromagnetic wave was measured without covering the obstacle 10 with the disclosed system first, and measured again after the obstacle 10 was covered by the disclosed system. As demonstrated by the measurements, with the obstacle 10 covered by the disclosed system, the electromagnetic wave at 6.8 GHz bypassed the obstacle 10 successfully, and the power gain obtained beyond the obstacle 10 was up to 100 times (about 20 dB) more.

Figure 14:
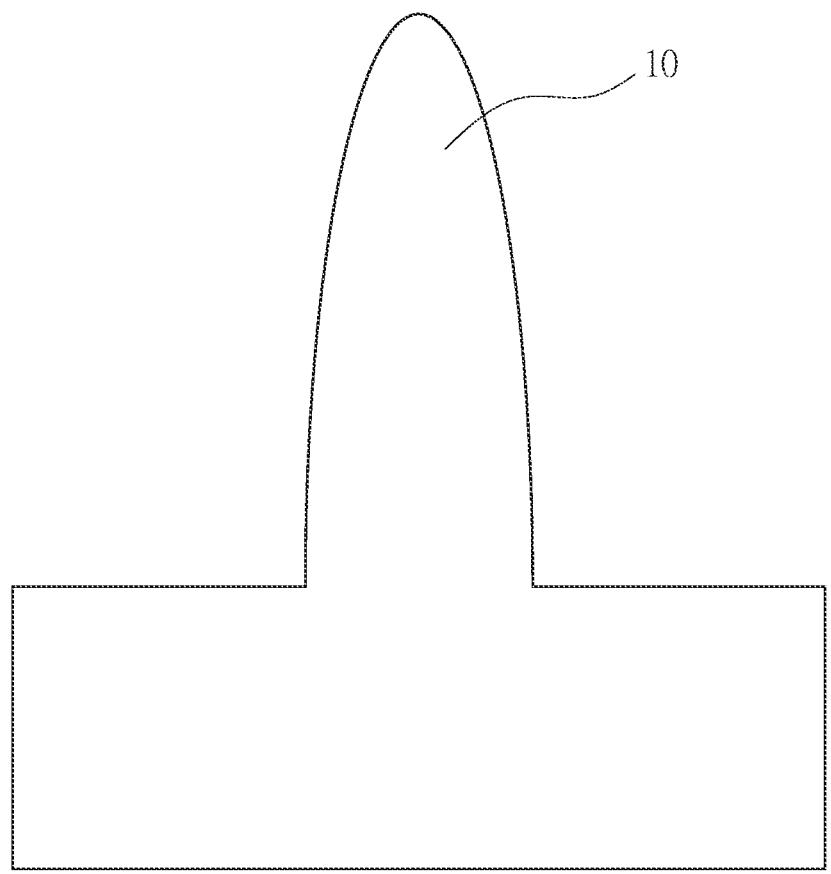
FIG. 14 is a top view of the obstacle.
Figure 15:
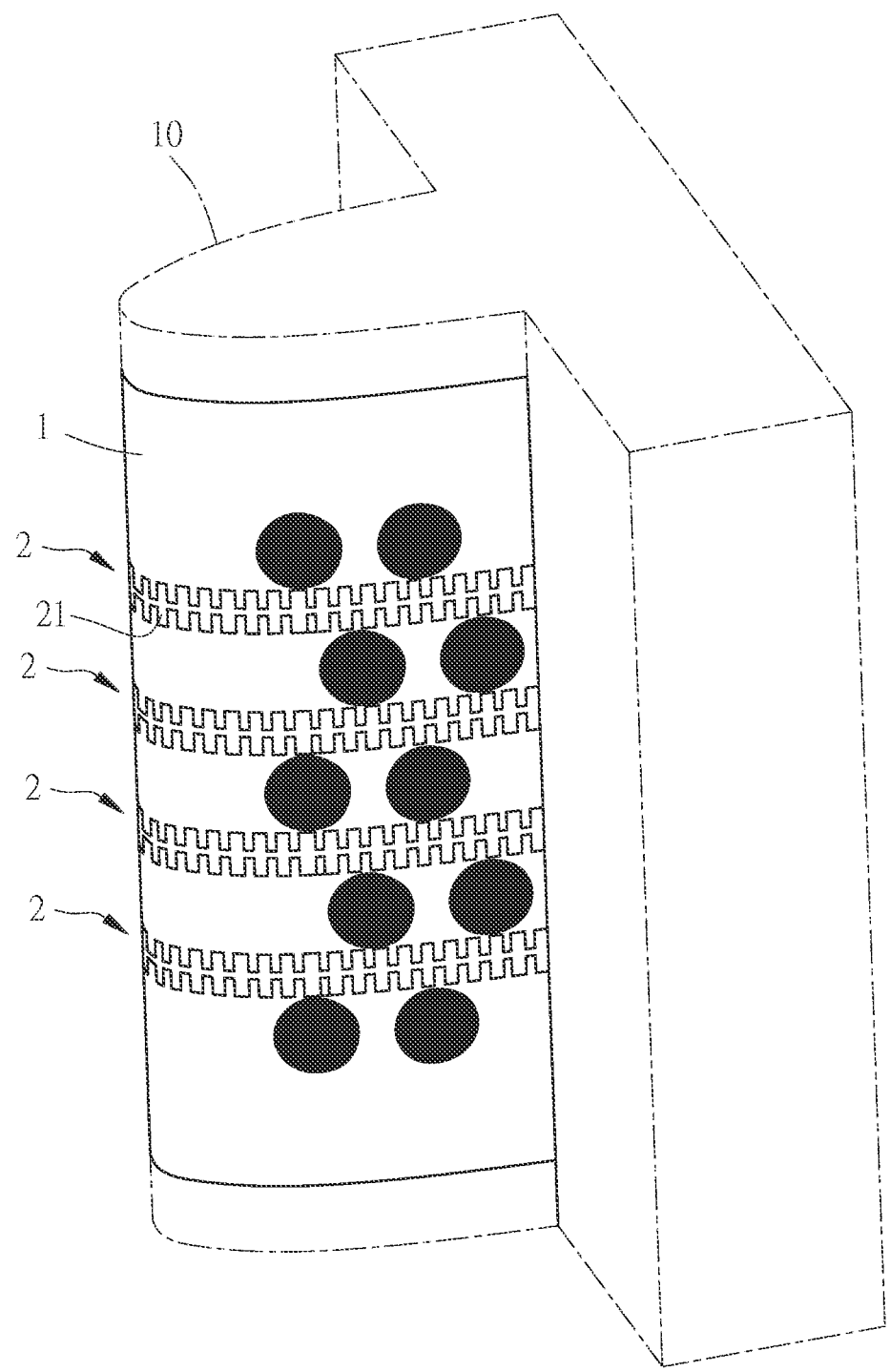
FIG. 15 is a perspective view of a system according to a fourth embodiment of the present disclosure covering the obstacle.

FIG. 14 through FIG. 15 illustrate a fourth embodiment of the disclosed system. It is similar to the third embodiment except that the present system only partially cover the obstacle 10. The obstacle 10 may be, for example, a wall and a column raised from the wall. When implemented, the disclosed system may be not large enough to fully encircle the obstacle 10. Instead, it may only cover a local area of the obstacle 10. In the present embodiment, the system only covers a part of the column. When the incoming electromagnetic wave is coupled to the transmission lines 21 by the antennas 3, the TL electromagnetic waves are transmitted to terminals of the transmission units 2, and this causes reflection. The reflected TL electromagnetic waves and the flowing-in TL electromagnetic waves overlap to form standing waves, so as to cause radiation effects of a broadside array at the terminals of the transmission line units 2. Therefore, even of the system only covers a part of the obstacle 10, the electromagnetic wave would still bypass the obstacle 10 and radiate with the help of the system. It is to be further noted that, where the disclosed system covers two reverse sides of the obstacle 10, when the electromagnetic wave arrives one of the sides in the incidence direction, radiation happening at the other side is also in the same incidence direction.

Figure 16:
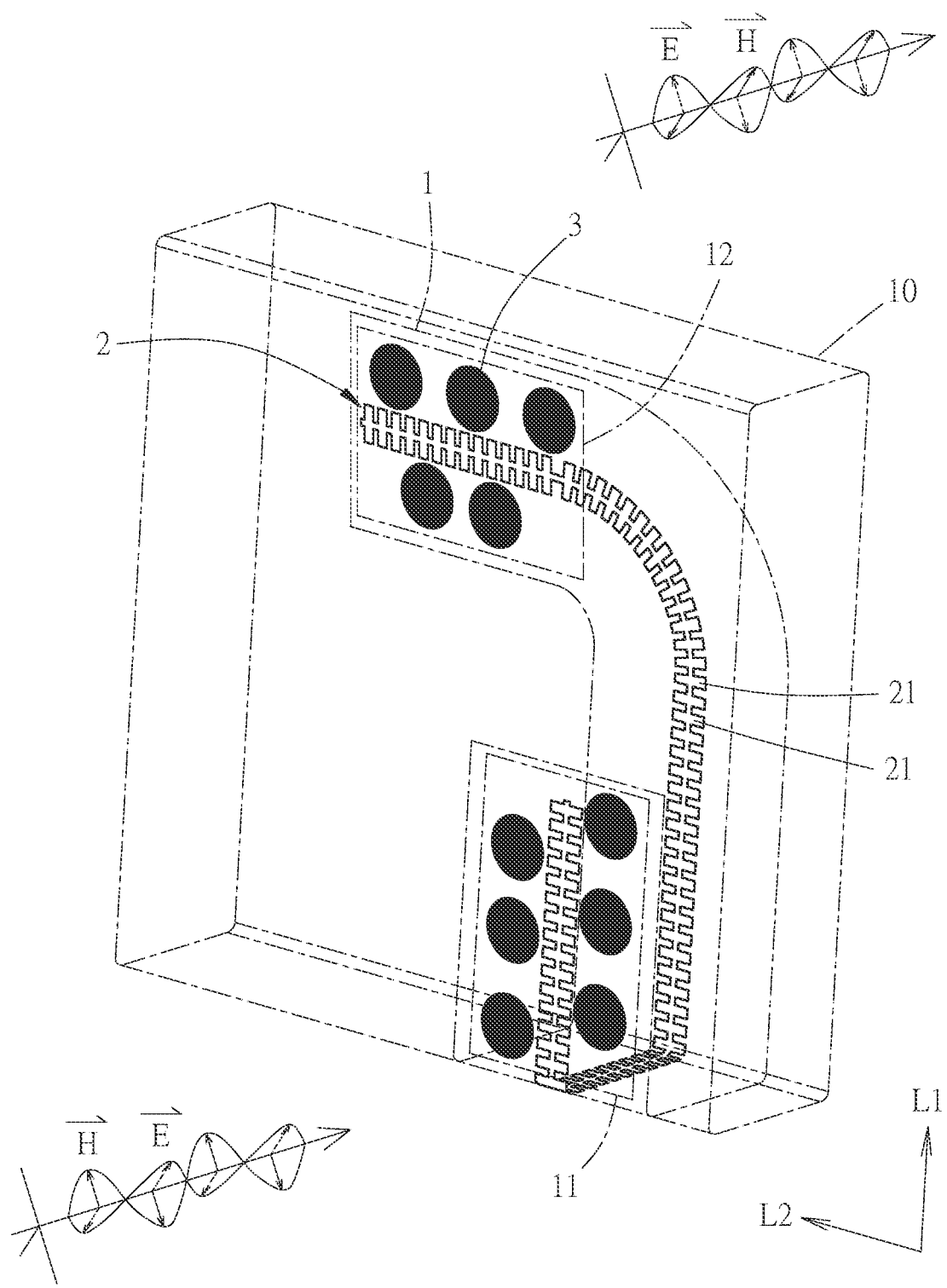
FIG. 16 is a perspective view of a system according to a fifth embodiment of the present disclosure covering the obstacle.

Referring to FIG. 16, a fifth embodiment of the disclosed system is similar to the fourth embodiment except that the transmission units 2 have some turns at some certain sites. In other words, connection of the transmission lines 21 is not linear at these sites. Instead, the transmission unit 2 when extending turns from a first direction $L_1$ to a second direction $L_2$ that is perpendicular to the first direction $L_1$. The radius of curvature of the transmission unit 2 is at least one fifth of the first medium operation wavelength. The second transmission portions 212 of each of the transmission lines 21 (FIG. 2) spaced in the first transmission portion 211 along the length direction of the first transmission portion 211 (FIG. 2). The substrate 1 comprises an incidence area 11 and a transmission area 12. The incidence area 11 and the transmission area 12 are at two reverse sides of the obstacle 10. The antennas 3 are disposed in the incidence area 11 and the transmission area 12 on the substrate 1, respectively. The antennas 3 are close to the transmission lines 21 in the incidence area 11 and in the transmission area 12, respectively, and located on sites having approximate phases in corresponding said transmission lines in the incidence area 11 and in the transmission area 12. When the disclosed system partially covers the obstacle 10, the incidence area 11 and the electromagnetic wave are at the same side of the obstacle 10. The antennas 3 in the incidence area 11 feed the electromagnetic wave to the corresponding transmission lines 21 to form the TL electromagnetic waves. The TL electromagnetic waves are transmitted to the transmission area 12 by the transmission lines 21, and the antennas 3 in the transmission area 12 couple the TL electromagnetic waves to radiate the TL electromagnetic waves outward. Therefore, by adjusting locations and scopes of the incidence area 11 and the transmission area 12 on the substrate 1, it is possible to control where the electromagnetic wave is diffracted to for re-transmission. It is to be noted that, the electromagnetic wave hits the antennas 3 in the incidence area 11 in a form of horizontal polarization, and leaves the transmission area 12 in a form of perpendicular polarization. The disclosed system makes the electromagnetic wave achieve polarization conversion.

Figure 17:
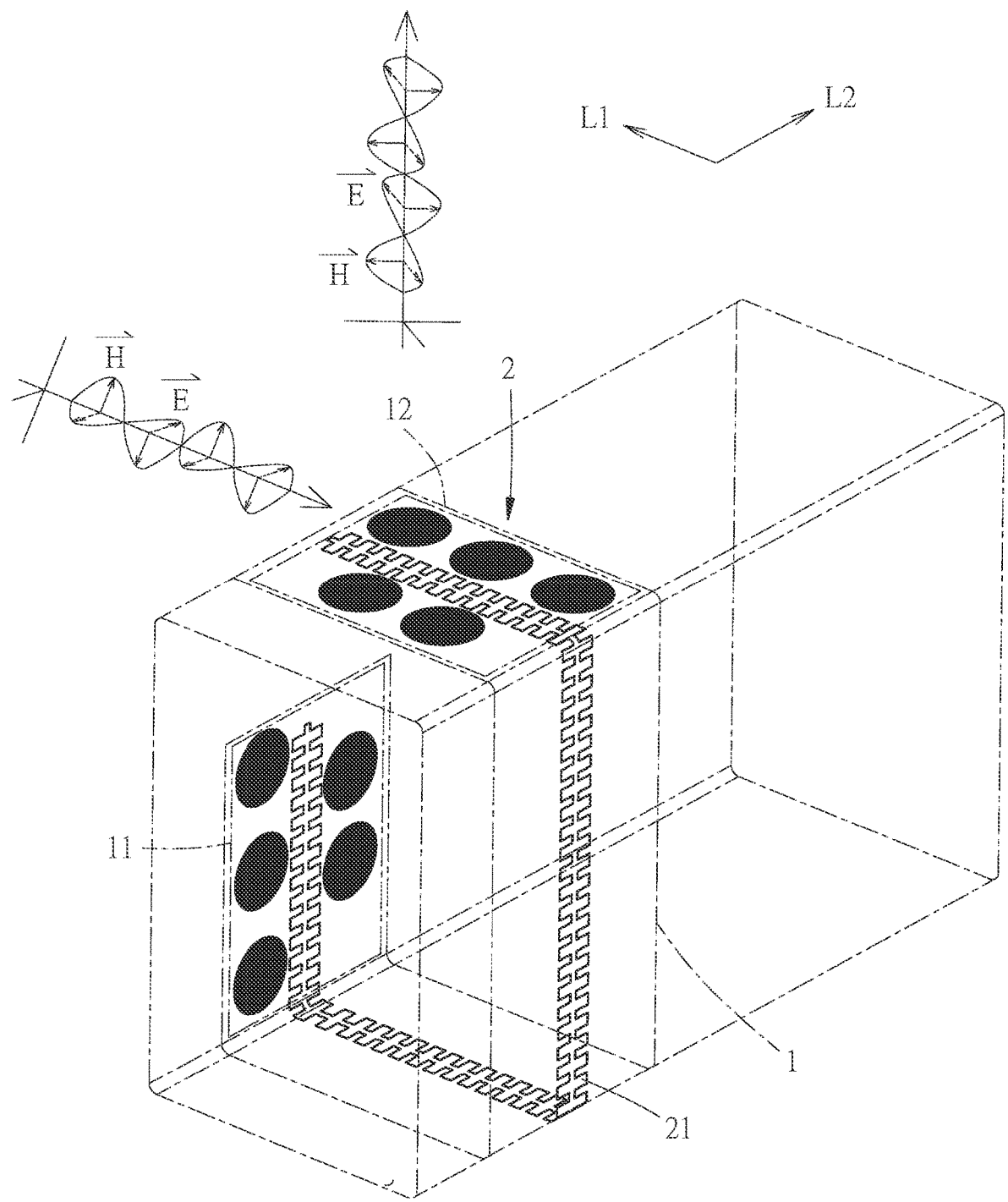
FIG. 17 is a perspective view of a system according to a sixth embodiment of the present disclosure covering the obstacle.

FIG. 17 a sixth embodiment of the disclosed system. It is similar to the fifth embodiment except that the incidence area 11 and the transmission area 12 are at two adjacent surface of the obstacle 10. The transmission unit 2 extends from the incidence area 11 to the side of the obstacle 10 reverse to the incidence area 11 and then extends to the transmission area 12, but the transmission unit 2 extends to the transmission area 12 without any turns. The electromagnetic wave is diffracted in a way similar to that described in the fifth embodiment. The antennas 3 in the incidence area 11 feed the electromagnetic wave to the corresponding transmission lines 21 to form the TL electromagnetic waves. The TL electromagnetic waves are transmitted to the transmission area 12 through the transmission lines 21. The antennas 3 in the transmission area 12 couple the TL electromagnetic waves and radiate the TL electromagnetic waves outward. The radiated electromagnetic wave changes its travel direction. Since the transmission unit 2 is not bent, the electromagnetic wave does not form the polarization conversion.

Figure 18:
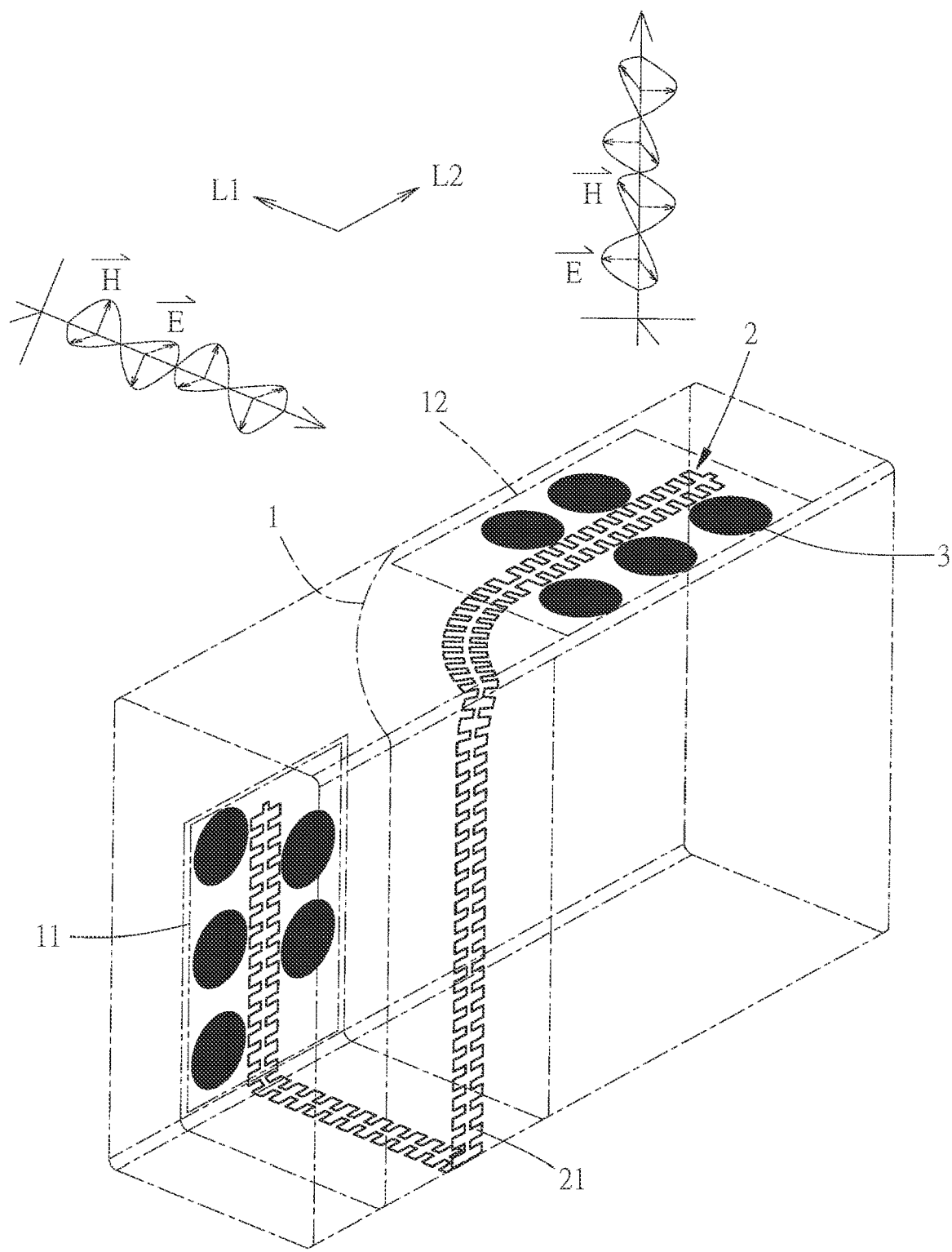
FIG. 18 is a perspective view of a system according to a seventh embodiment of the present disclosure covering the obstacle.

FIG. 18 depicts a seventh embodiment of the disclosed system. It is similar to the sixth embodiment except that the transmission unit 2 extends from the incidence area 11 to the transmission area 12 along a bending path. The electromagnetic wave comes to the antennas 3 in the incidence area 11 in the horizontal polarization form, and the electromagnetic wave radiates outward from the transmission area 12 in the perpendicular polarization form. The disclosed system makes the electromagnetic wave achieve polarization conversion. It is to be further noted that, where the electromagnetic wave enters in a direction that includes an angle with the normal vector of the incidence area 11, the electromagnetic wave radiates out from the transmission area 12 in a direction that includes the same angle with the normal vector of the transmission area 12.

To sum up, with the disclosed system covering the obstacle 10, the antennas 3 feed the electromagnetic wave to the transmission units 2 to form the TL electromagnetic waves, which are then transmitted to further antennas 3 by the transmission units 2 before the further antennas 3 finally radiate the TL electromagnetic waves outward. This allows the electromagnetic wave to bypass the obstacle 10, thereby solving the problems about communication dead zones otherwise caused by the obstacle 10. Additionally, when the electromagnetic wave enters the first side 101 of the obstacle 10 in the incidence direction that includes the angle with the normal vector of the first side, the electromagnetic wave at the second side 102 radiates outward in the direction that includes the same angle with the normal vector of the second side 102, so the travel direction of the electromagnetic wave is controllable. In addition, by adjusting locations and scopes of the incidence area 11 and the transmission area 12 on the substrate 1 and placing the antennas close to the transmission lines in the incidence area and in the transmission area, respectively, it is possible to control where the electromagnetic wave is diffracted to for re-transmission. Moreover, by having the transmission units extend and turn from the first direction L₁ to the second direction L₂ perpendicular to the first direction L₁, transmission of the electromagnetic wave through the system achieves polarization conversion.

The present disclosure has been described with reference to the abovementioned embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

What is claimed is:

1. A system for diffraction of an electromagnetic wave, being characterized in comprising:
    a substrate, set in a space rife of a first medium and made of a second medium;
    a transmission unit, disposed on the substrate and including a plurality of transmission lines, each said transmission line having a transmission line length that is associated with a first medium operation wavelength that is associated with an operation frequency, and the transmission lines being connected successively; and
    a plurality of antennas, each of which is disposed on the substrate, close to at least some of the transmission lines, and located on sites having approximate phases in corresponding said transmission lines, so that each said antenna is able to feed the electromagnetic wave it receives at the operation frequency to corresponding said transmission lines for transmission, and is able to radiate the electromagnetic wave transmitted in corresponding said transmission lines outward at the operation frequency, each of the plurality of antennas is a dipole antenna, and a gap between centers of each two adjacent of said dipole antennas ranges between one fourth and three fourths of the first medium operation wavelength.

2. The system of claim 1, wherein each said transmission line is a spoof surface plasmon polaritons transmission line (SSPP TL), and includes a first transmission portion and a second transmission portion, in which the first transmission portion has a quadrilateral geometry and the second transmission portion has a quadrilateral geometry and is disposed in the first transmission portion.

3. The system of claim 1, wherein each said transmission line includes a first transmission portion and a plurality of second transmission portions, in which the first transmission portion has a quadrilateral geometry and the second transmission portions are spaced in the first transmission portion along a length direction of the first transmission portion, with each said second transmission portion having a quadrilateral geometry.

4. The system of claim 1, wherein each said transmission line includes a first transmission portion and a plurality of second transmission portions, in which the first transmission portion has a quadrilateral geometry and has a length parallel to an extension direction, and the second transmission portions are spaced in the first transmission portion along a direction parallel to the extension direction, each said second transmission portion having a quadrilateral geometry and having a length that is perpendicular to the extension direction and is symmetrical about the first transmission portion, every two adjacent said second transmission portions being separated by a first gap a, a distance from a site on one said second transmission portion to a corresponding site on the adjacent second transmission portion being a second gap p, a minimum distance from either end of one said second transmission portion in a direction perpendicular to the extension direction to the first transmission portion being a third gap H, wherein the first gap a, the second gap p and the third gap H have a relationship represented by an equation:

$$\left(\frac{a}{p}\right)^2 = \left[\left(\frac{ck_{sspp}}{\omega\sqrt{\varepsilon_r}}\right)^2 - 1\right]\cot^2\left(2H\sqrt{\varepsilon_r}\frac{\omega}{c}\right)$$

where $k_{sspp}$ is an operation frequency wavenumber, $\lambda_{sspp}$ is an operation wavelength, which is associated with the first medium operation wavelength, $\varepsilon_r$ is a dielectric constant, $\omega$ is an angular frequency of the operation frequency, c is the velocity of light, a is the first gap, p is the second gap, and H is the third gap.

5. The system of claim 1, further comprising a plurality of insulating members, wherein the antennas are arranged on the transmission lines, respectively, and the insulating members are disposed between the transmission lines and the antennas, in which each said insulating member is made of an electrically non-conductive material.

6. The system of claim 1, wherein each said antenna is a patch antenna coplanar with the transmission unit, and the patch antennas are disposed at two sides of the transmission unit about a length direction of the transmission unit in a close and staggered arrangement.

7. The system of claim 6, wherein a gap between centers of each two adjacent said staggered patch antennas in a direction parallel to the length direction of the transmission line ranges between one fourth and three fourths of the first medium operation wavelength.

8. The system of claim 1, wherein the transmission unit extends and turns from a first direction to a second direction that is perpendicular to the first direction at a radius of curvature that is at least one fifth of the first medium operation wavelength.

9. A method for diffraction of an electromagnetic wave using the system of claim 1, comprising:
    covering an obstacle with the system, wherein the obstacle obstructs propagation of the electromagnetic wave and has a first side and a second side;
    having the electromagnetic wave enter the system at the first side in an incidence direction, wherein a first included angle is defined between the incidence direction and a normal vector of the first side;
    having the antennas at the first side receive the electromagnetic wave and feed the received electromagnetic wave to the corresponding transmission line for transmission;
    having the transmission line transmit the electromagnetic wave to a site at the second side; and
    having the antennas at the second side radiate the electromagnetic wave outward in a radiation direction, with a second included angle defined between the radiation direction and a normal vector of the second side, wherein the second included angle is equal to the first included angle.

10. The method of claim 9, wherein each said transmission line is a spoof surface plasmon polaritons transmission line (SSPP TL), and each said transmission line includes a first transmission portion and a second transmission portion, in which the first transmission portion has a quadrilateral geometry, and the second transmission portion has a quadrilateral geometry and is disposed in the first transmission portion.

11. The method of claim 9, wherein each said transmission line includes a first transmission portion and a plurality of second transmission portions, in which the first transmission portion has a quadrilateral geometry, and the second transmission portions are spaced in the first transmission portion along a length direction of the first transmission portion, with each said second transmission portion having a quadrilateral geometry.

12. The method of claim 9, wherein each said transmission line includes a first transmission portion and a plurality of second transmission portions, in which the first transmission portion has a quadrilateral geometry and has a length parallel to an extension direction, and the second transmission portions are spaced in the first transmission portion along a direction parallel to the extension direction, each said second transmission portion having a quadrilateral geometry having a length perpendicular to the extension direction, and being symmetrical about the first transmission portion, every two adjacent said second transmission portions being separated by a first gap a, a distance from a site on one said second transmission portion to a corresponding site on the adjacent second transmission portion being a second gap p, a minimum distance from either end of one said second transmission portion in a direction perpendicular to the extension direction to the first transmission portion being a third gap H, wherein the first gap a, the second gap p and the third gap H have a relationship represented by:

$$\left(\frac{a}{p}\right)^2 = \left[\left(\frac{ck_{sspp}}{\omega\sqrt{\varepsilon_r}}\right)^2 - 1\right]\cot^2\left(2H\sqrt{\varepsilon_r}\,\frac{\omega}{c}\right)$$

where $k_{sspp}$ is an operation frequency wavenumber, $\lambda_{sspp}$ is an operation wavelength, which is associated with the first medium operation wavelength, $\varepsilon_r$ is a dielectric constant, $\omega$ is an angular frequency of the operation frequency, c is the velocity of light, a is the first gap, p is the second gap, and H is the third gap.

13. The method of claim 9, wherein the system further comprises a plurality of insulating members, and the antennas are disposed on the transmission lines, respectively, in which the insulating members are disposed between the transmission lines and the antennas, respectively, with each said insulating member being made of an electrically non-conductive material.

14. The method of claim 9, wherein each said antenna is a dipole antenna, and a gap between centers of each two adjacent said dipole antennas ranges between one fourth and three fourths of the first medium operation wavelength.

15. The method of claim 9, wherein each said antenna is a patch antenna, and the patch antennas and the transmission unit are coplanar, in which the patch antennas are disposed on two sides of the transmission unit about a length direction of the transmission line in a close and staggered arrangement.

16. The method of claim 15, wherein a gap between centers of each two adjacent said staggered patch antennas in a direction parallel to the length direction of the transmission line ranges between one fourth and three fourths of the first medium operation wavelength.

17. The method of claim 9, wherein when the transmission unit extends and turns from a first direction to a second direction that is perpendicular to the first direction, a radius of curvature of a turning part of the transmission unit is at least one fifth of the first medium operation wavelength.

18. A system for diffraction of an electromagnetic wave, being characterized in comprising:
   a substrate, set in a space rife of a first medium and made of a second medium;
   a transmission unit, disposed on the substrate and including a plurality of transmission lines, each said transmission line having a transmission line length that is associated with a first medium operation wavelength that is associated with an operation frequency, and the transmission lines being connected successively, each said transmission line includes a first transmission portion and a plurality of second transmission portions, in which the first transmission portion has a quadrilateral geometry and has a length parallel to an extension direction, and the second transmission portions are spaced in the first transmission portion along a direction parallel to the extension direction, each said second transmission portion having a quadrilateral geometry and having a length that is perpendicular to the extension direction and is symmetrical about the first transmission portion, every two adjacent said second transmission portions being separated by a first gap a, a distance from a site on one said second transmission portion to a corresponding site on the adjacent second transmission portion being a second gap p, a minimum distance from either end of one said second transmission portion in a direction perpendicular to the extension direction to the first transmission portion being a third gap H, wherein the first gap a, the second gap p and the third gap H have a relationship represented by an equation:

$$\left(\frac{a}{p}\right)^2 = \left[\left(\frac{ck_{sspp}}{\omega\sqrt{\varepsilon_r}}\right)^2 - 1\right]\cot^2\left(2H\sqrt{\varepsilon_r}\,\frac{\omega}{c}\right)$$

where $k_{sspp}$ is an operation frequency wavenumber, $\lambda_{sspp}$ is an operation wavelength, which is associated with the first medium operation wavelength, $\varepsilon_r$ is a dielectric constant, $\omega$ is an angular frequency of the operation frequency, c is the velocity of light, a is the first gap, p is the second gap, and H is the third gap; and
   a plurality of antennas, each of which is disposed on the substrate, close to at least some of the transmission lines, and located on sites having approximate phases in corresponding said transmission lines, so that each said antenna is able to feed the electromagnetic wave it receives at the operation frequency to corresponding said transmission lines for transmission, and is able to radiate the electromagnetic wave transmitted in corresponding said transmission lines outward at the operation frequency.

* * * * *